United States Patent
Liu et al.

(10) Patent No.: US 9,329,709 B2
(45) Date of Patent: May 3, 2016

(54) TOUCH DISPLAY DEVICE

(71) Applicant: HANNSTOUCH SOLUTION INCORPORATED, Tainan (TW)

(72) Inventors: Yu-Wei Liu, Kaohsiung (TW); Chuan-Hui Su, Kaohsiung (TW); Pin-Yu Hsu, Tainan (TW); Yao-Chih Chuang, Tainan (TW); Han-Ming Chen, Tainan (TW); Sian-Zong Liao, Taichung (TW); Jia-Ming Ye, Taichung (TW)

(73) Assignee: HANNSTOUCH SOLUTION INCORPORATED (TW)

( * ) Notice: Subject to any disclaimer, the term of this patent is extended or adjusted under 35 U.S.C. 154(b) by 658 days.

(21) Appl. No.: 13/722,304

(22) Filed: Dec. 20, 2012

(65) Prior Publication Data

US 2013/0335345 A1    Dec. 19, 2013

(30) Foreign Application Priority Data

Jun. 14, 2012  (TW) .............................. 101121392 A

(51) Int. Cl.
*G06F 3/041*   (2006.01)
*G06F 3/044*   (2006.01)

(52) U.S. Cl.
CPC ................ *G06F 3/041* (2013.01); *G06F 3/044* (2013.01); *G06F 2203/04103* (2013.01)

(58) Field of Classification Search
CPC  G06F 3/041; G06F 3/044; G06F 2203/04103

USPC .................................................. 345/173, 174
See application file for complete search history.

(56) References Cited

U.S. PATENT DOCUMENTS

2005/0179853 A1* 8/2005 Chen .................. G02F 1/13394
                                                349/155
2013/0141347 A1* 6/2013 Wu ......................... G06F 3/041
                                                345/173

FOREIGN PATENT DOCUMENTS

TW       M397551 U1    2/2011
TW       M415361 U1    4/2011
TW       201142669 A1  12/2011

OTHER PUBLICATIONS

Office Action issued in Taiwanese Patent Application No. 101121392 on May 12, 2014, consisting of 8 pp.

* cited by examiner

*Primary Examiner* — Jonathan Boyd
(74) *Attorney, Agent, or Firm* — Volpe and Koenig, P.C.

(57) ABSTRACT

A touch display device includes a transparent substrate, a light-blocking frame layer and a transparent protecting layer. The transparent substrate includes a frame area and a visual area. The light-blocking frame layer is disposed above the frame area of the transparent substrate. The transparent protecting layer is disposed above the transparent substrate and the light-blocking frame layer, and includes a gap having a projection on the transparent substrate, wherein the projection of the gap has one of conditions of at least partially overlapping the light-blocking frame layer and being located at a distance less than 2 millimeters from the light-blocking frame layer.

6 Claims, 6 Drawing Sheets

TOUCH DISPLAY DEVICE

CROSS-REFERENCE TO RELATED APPLICATIONS

The application claims the benefit of Taiwan Patent Application No. 101121392, filed on Jun. 14, 2012, at the Taiwan Intellectual Property Office, the disclosures of which are incorporated herein in their entirety by reference.

FIELD OF THE INVENTION

The present disclosure relates to a touch control device, especially to a touch display device.

BACKGROUND OF THE INVENTION

In the past, since the sensitivity of the touch control for touch panels is not high enough, the touch-panel screens only appear as the display devices with larger areas for the touch-control commands on the screen, e.g. ticket issuing machines, vending machines, tour information machines, etc. Most display devices, e.g. computer monitors, notebook computers, etc., still adopt the mice with much higher control sensitivity. As the technologies of the touch panels are continuously advancing, the sensitivity of the touch control has been raised, and the technologies of dual-point touch controls appear and bring great convenience for users. Thus, the touch panels are gradually and widely applied to the portable display devices, e.g. tablet computers, touch pad, smart mobile phones, etc., and become widely popular to most users.

Since the portable display devices are expected to be carried by users often, all the users hope that these devices can be as slim as possible. Thus, there is a trend in the industry to adopt the design of a single piece of glass to replace the conventional design of two pieces of glass for the manufactures of touch glass components so as to reduce the thickness and weight of the touch display devices. For the single glass design, the structures with touch control function are fabricated right on the internal surface of the originally required cover glass. However, interference mura frequently appears around the area close to the edge of the touch panel for the current single glass designs and seriously deteriorates the visual performance of the touch panels. On the other hand, the pictures of the touch panels manufactured by the prior art frequently have the problem of color shift that the colors of the pictures are distorted. Especially for the displayed pictures with the colors of human skins or the colors familiar to the public, e.g. yellow color taxi, the color shift would seriously affect the visual performance for viewers.

From the above, it can be understood that the visual performance and the structures of the touch panels need to be improved. For overcoming the above mentioned problems occurring in the prior art, novel touch display devices able to solve the mentioned problem have been developed after a lot of researches, analyses and experiments by the inventors.

SUMMARY OF THE INVENTION

The present disclosure provides touch display devices.

In accordance with one aspect of the present disclosure, a touch display device is provided. The touch display device includes a transparent substrate, a light-blocking frame layer and a transparent protecting layer. The transparent substrate includes a frame area and a visual area. The light-blocking frame layer is disposed above the frame area of the transparent substrate. The transparent protecting layer is disposed above the transparent substrate and the light-blocking frame layer, and includes a gap having a projection on the transparent substrate, wherein the projection of the gap has one of conditions of at least partially overlapping the light-blocking frame layer and being located at a distance less than 2 millimeters from the light-blocking frame layer.

In accordance with another aspect of the present disclosure, a touch display device is provided. The touch display device displays a picture having a color shift, and includes a transparent substrate, plural transparent electrode patterns and a light-blocking frame layer. The transparent substrate includes a frame area and a visual area. The light-blocking frame layer is disposed above the frame area of the transparent substrate. The color shift adjusting film is disposed above the visual area of the transparent substrate for performing one of functions of correcting the color shift of the picture and improving a visual performance of the plural transparent electrode patterns.

In accordance with a further aspect of the present disclosure, a touch display device is provided. The touch display device displays a picture having a color shift, and includes a transparent substrate, a touch sensing structure, a color shift adjusting film and a transparent protecting layer. The touch sensing structure is disposed above the transparent substrate for enabling a touch-sensing function for the touch control display, and is patterned to form plural transparent electrode patterns. The anti-noise transparent conductive layer is disposed below the transparent substrate for shielding a noise. The color shift adjusting film is disposed at one of places above and below the transparent substrate for performing one of functions of correcting the color shift of the picture and causing the plural transparent electrode patterns to be invisible. The transparent protecting layer is disposed above the transparent substrate.

In accordance with one more aspect of the present disclosure, a touch display device is provided. The touch display device includes a light-blocking frame layer, a transparent protecting layer and a mura-eliminating structure. The transparent protecting layer includes a frame area and a visual area. The mura-eliminating structure is disposed between the visual area and the light-blocking frame for eliminating any mura in the visual area.

The above objects and advantages of the present disclosure will become more readily apparent to those ordinarily skilled in the art after reviewing the following detailed descriptions and accompanying drawings, in which:

DETAILED DESCRIPTION OF THE PREFERRED EMBODIMENTS

The present disclosure will now be described more specifically with reference to the following embodiments. It is to be noted that the following descriptions of preferred embodiments of this disclosure are presented herein for the purposes of illustration and description only; it is not intended to be exhaustive or to be limited to the precise form disclosed.

Figure 1A:
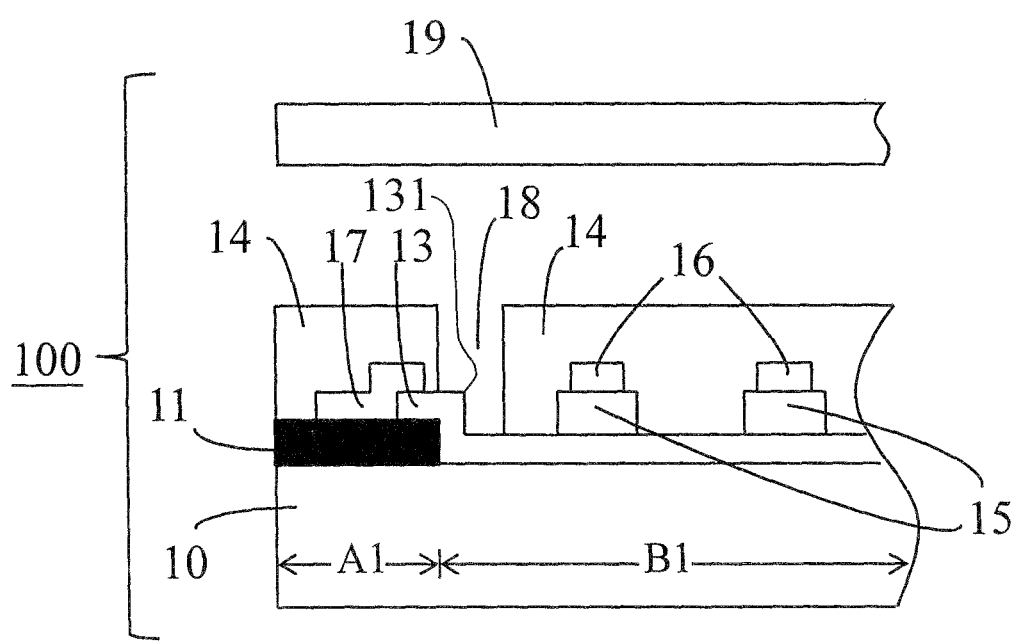
FIG. 1A is the schematic diagram showing a cross-sectional view of a touch display device along the X-X cutting line in FIG. 1B with a display module in one embodiment of the present disclosure.
Figure 1B:
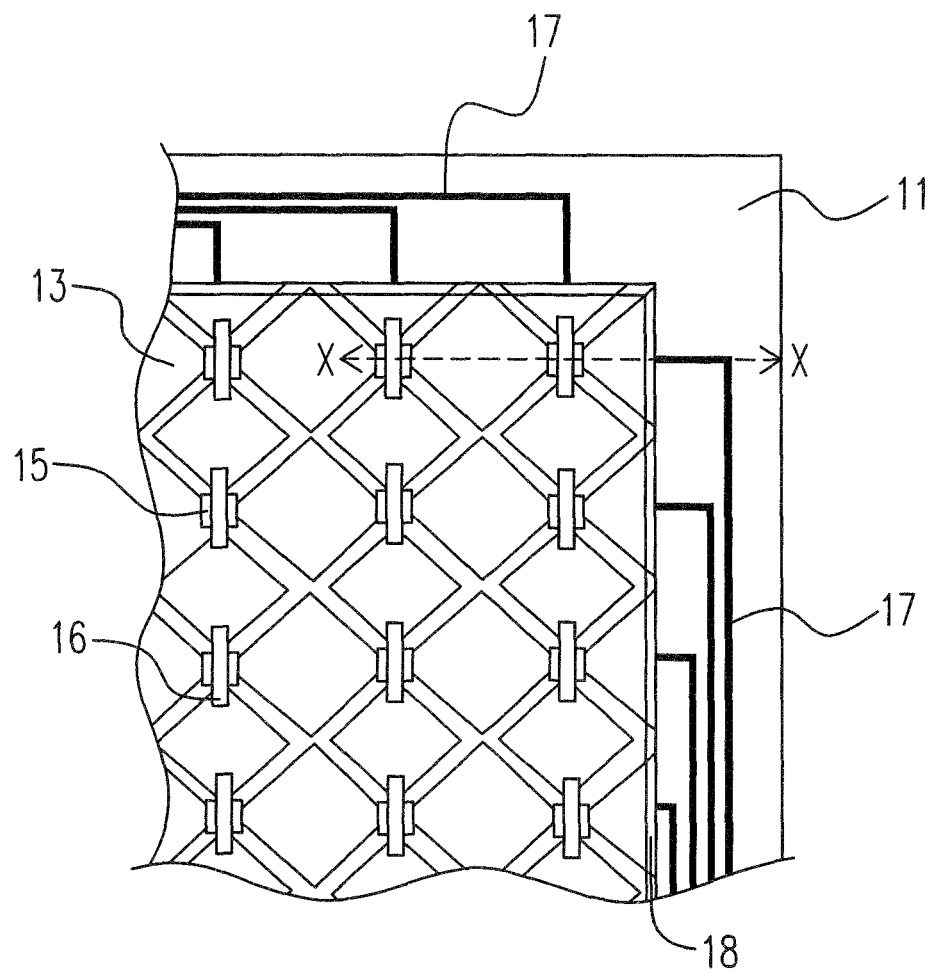
FIG. 1B is the schematic diagram showing a top view of the touch display device in FIG. 1A except the display module in one embodiment of the present disclosure.

FIG. 1A shows a cross-sectional view of a touch display device 100 along the X-X cutting line in FIG. 1B with a display module 19 in one embodiment of the present disclosure; while FIG. 1B shows a top view of the touch display device 100 in FIG. 1A except the display module 19. As shown in FIG. 1A, the touch display device 100 include a transparent substrate 10, a light-blocking frame layer 11, a first conductive layer 13, an insulation layer 15, a second conductive layer 16, a metal line 17, a mura-eliminating structure 18, a transparent protecting layer 14 and a display module 19. The transparent substrate 10 includes a frame area A1 and a visual area B1. The light-blocking frame layer 11 is disposed above the frame area A1 of the transparent substrate 10. From the pictures displayed by the display module 19 above the transparent substrate 10, the light beam emitted downwardly onto the frame area A1 of the light-blocking frame layer 11 will be absorbed and blocked, since the light-blocking frame layer 11 has the function of light blocking; while the light beam emitted onto the visual area B1 will pass through the transparent substrate 10 and reach eyes of a viewer.

The transparent protecting layer 14 is disposed above the transparent substrate 10 and the light-blocking frame layer 11, and also includes a frame area A1 and a visual area B1 vertically corresponding to the frame area A1 and the visual area B1 of the transparent substrate 10, respectively. That is, the frame area A1 of the transparent protecting layer 14 is disposed vertically right above the frame area A1 of the transparent substrate 10, and the visual area B1 of the transparent protecting layer 14 is disposed vertically right above the visual area B1 of the transparent substrate 10. For instance, the transparent protecting layer 14 serves as an insulation layer.

The touch display device 100 includes a mura-eliminating structure 18, e.g. a gap in this embodiment, which is disposed according to a boundary between the visual area B1 and the light-blocking frame layer 11 for eliminating the interference mura appearing in the visual area B1. The projection of the mura-eliminating structure 18, e.g. the gap, onto the transparent substrate 10 can partially overlap the light-blocking frame layer 11, or be adjacent to the light-blocking frame layer 11 without overlapping, or be disposed at a distance within 2 millimeters from the light-blocking frame layer 11 so as to eliminate the interference mura. Although the mura-eliminating structure 18 is the gap in this embodiment, the mura-eliminating structure 18 can be stuffed by a material with the refractive index lower than that of the transparent protecting layer 14, and disposed in the same location based on the concept of the present disclosure. In this embodiment, the mura-eliminating structure 18 can effectively eliminate the interference mura appearing around the edge of the visual area B1, and greatly promote the visual performance.

In one embodiment, the touch display device 100 further includes a material having a refractive index lower than a refractive index of the transparent protecting layer 14, wherein the mura-eliminating structure 18 is filled with the material. For instance, the material includes an optical adhesive, which has a refractive index ranged from 1.3 to 1.6 (typically ranged from 1.45 to 1.55). For instance, the material includes a magnesium fluoride ($MgF_2$), which has a refractive index ranged from 1.3 to 1.48 (typically ranged from 1.35 to 1.39).

As shown in FIG. 1A, the first conductive layer 13 is disposed above the transparent substrate 10, and can partially overlap the light-blocking frame layer 11. The insulation layer 15 is disposed above the first conductive layer 13, and the second conductive layer 16 is disposed above the insulation layer 15 and the first conductive layer 13, as shown in FIG. 1A.

In the present embodiment, the material of the light-blocking frame layer 11, which can directly contact the transparent substrate 10 as shown in FIG. 1A, can be black opaque material. In other embodiments, other layers can intervene between the light-blocking frame layer 11 and the transparent substrate 10.

In this embodiment, the other portions of the transparent protecting layer 14 except the mura-eliminating structure 18, e.g. the gap, can cover the first conductive layer 13, the insulation layer 15, the second conductive layer 16, the metal line 17 and light-blocking frame layer 11. The width of the gap is ranged from 20 microns to 2 millimeters. In one embodiment, the light-blocking frame layer 11 has an inner edge, the gap has an outer edge disposed inwards from the inner edge, and the inner edge and the outer edge have the distance therebetween. For instance, the distance is ranged from 0 to 2000 microns. It is preferred that the distance is ranged from 10 microns to 100 microns. The gap can form a surrounding groove, like a city moat surrounding the city (i.e. the surrounding groove surrounding the visual area B1 in this embodiment), along the boundary between the frame area A1 and the visual area B1. This surrounding groove is usually rectangular from a top view, since the touch panel is usually rectangular. In one embodiment, this surrounding groove is one of a closed surrounding groove and an open surrounding groove. In one embodiment, the gap includes a plurality of gap portions, and each of the plurality of gap portions forms an open surrounding groove.

The material of the first conductive layer 13 can be transparent conductive material; while the material of the second conductive layer 16 can be metal, alloy or the transparent conductive material, which can be selected from indium tin oxide, gallium zinc oxide or other transparent conductive oxide. In one embodiment, the first conductive layer 13 has a corner 131 coupled to the gap. The corner 131 is exposed to the gap; that is, the corner 131 has a top surface and a side surface adjacent to the top surface, wherein each of the top and the side surfaces is exposed to the gap.

The top surface and the bottom surface of the insulation layer 15 can directly contact the first conductive layer 13 and the second conductive layer 16, respectively, as shown in FIG. 1A. As shown in the top view of FIG. 1B, the insulation layer 15 is patterned to form a matrix structure, from a top view, consisting of aligned plural lumps. The first conductive layer 13 is patterned to form regularly aligned plural rhombuses (can be other shapes and are not limited to rhombus shape). The second conductive layer 16 is patterned to form a matrix structure, from a top view, consisting of aligned plural lumps, which is located right above the matrix structure of the insulation layer 15. Each of the plural lumps in the second conductive layer 16 is connected with two adjacent rhombuses (can be other shapes and are not limited to rhombus shape) of the first conductive layer 13 in the vertical direction of FIG. 1B to form an electrically connected tier (or column) from top to bottom from the top view as shown in FIG. 1B. The sensed signal in each tier can be transmitted out from the metal line 17 located above the top of each tier. The other rhombuses, not connected with the second conductive layer 16, of the first conductive layer 13 are originally connected through patterning in the horizontally direction of FIG. 1B to form plural electrically connected rows of rhombuses. Similarly, the sensed signal in each row can be transmitted from the metal line 17 located on the right of each row. The whole structure resulting from patterning the above first conductive layer 13, the insulation layer 15 and the second conductive layer 16 can form plural transparent electrode patterns.

In this embodiment, the first conductive layer 13, the insulation layer 15, the second conductive layer 16 and the metal line 17 form a capacitance touch sensing structure. The material of the metal line 17 can be selected from molybdenum, aluminum, copper, silver, other metal or the alloy thereof.

In this embodiment, the display module 19 is disposed above the transparent substrate 10 for displaying pictures. The display module 19 can be selected from a liquid crystal display (LCD) module, a light emitting diode (LED) display module, an organic light emitting diode (OLED) display module and a polymer light emitting diode (PLED) display module. The light beam of the pictures displayed by the display module 19 can pass through the transparent protecting layer 14, the mura-eliminating structure 18, the second conductive layer 16, the insulation layer 15, the first conductive layer 13 and the transparent substrate 10 and reach eyes of a viewer. On the other hand, the light beam reaching the light-blocking frame layer 11 will be absorbed and blocked thereby, and will not reach the transparent substrate 10, so can not be seen by the viewer.

Figure 1C:
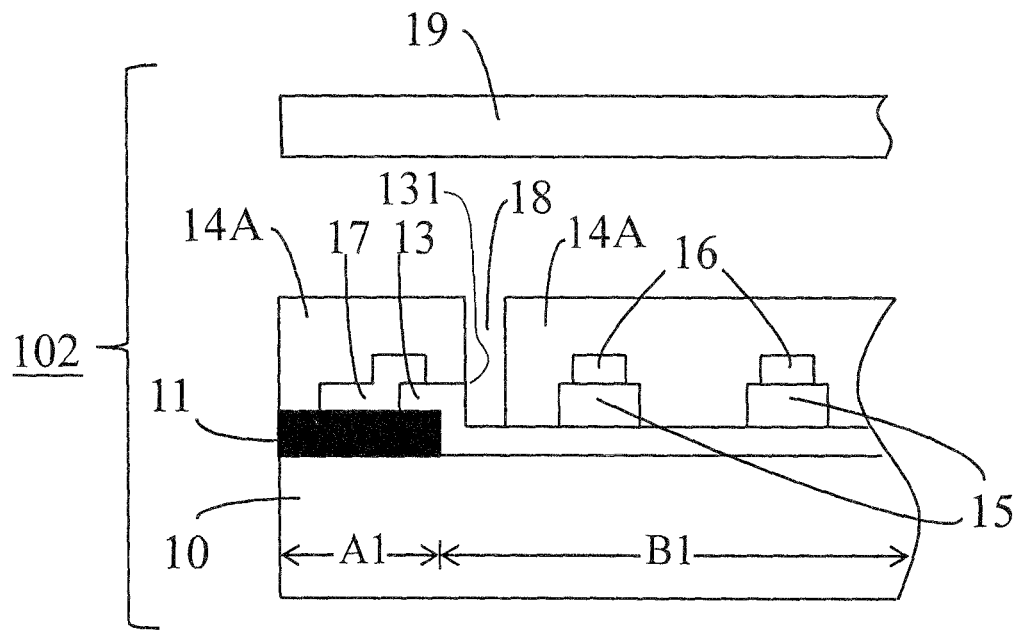
FIG. 1C is the schematic diagram showing a cross-sectional view of a touch display device along the X-X cutting line in FIG. 1B with a display module in one embodiment of the present disclosure.

FIG. 1C is the schematic diagram showing a cross-sectional view of a touch display device 102 along the X-X cutting line in FIG. 1B with a display module 19 in one embodiment of the present disclosure. As shown in FIG. 1C, the touch display device 102 include a transparent substrate 10, a light-blocking frame layer 11, a first conductive layer 13, an insulation layer 15, a second conductive layer 16, a metal line 17, a mura-eliminating structure 18, a transparent protecting layer 14A and a display module 19. The structure of the touch display device 102 in FIG. 1C is similar to the structure of the touch display device 100 in FIG. 1A. The characteristic features of the touch display device 102 are described as follows. The transparent protecting layer 14A is disposed above the transparent substrate 10 and the light-blocking frame layer 11, and also includes a frame area A1 and a visual area B1 vertically corresponding to the frame area A1 and the visual area B1 of the transparent substrate 10, respectively.

The mura-eliminating structure 18, e.g. the gap, is disposed between the frame area A1 of the transparent protecting layer 14A and the visual area B1 of the transparent protecting layer 14. The first conductive layer 13 has a corner 131 coupled to the gap. The corner 131 is partially exposed to the gap; that is, the corner 131 has a top surface and a side surface adjacent to the top surface, wherein the top surface is covered with the transparent protecting layer 14A (or the frame area A1 of the transparent protecting layer 14A), and the side surface is exposed to the gap. In one embodiment, the transparent protecting layer 14A has a side surface, which is exposed to the gap and is aligned with the side surface of the corner 131.

Figure 2:
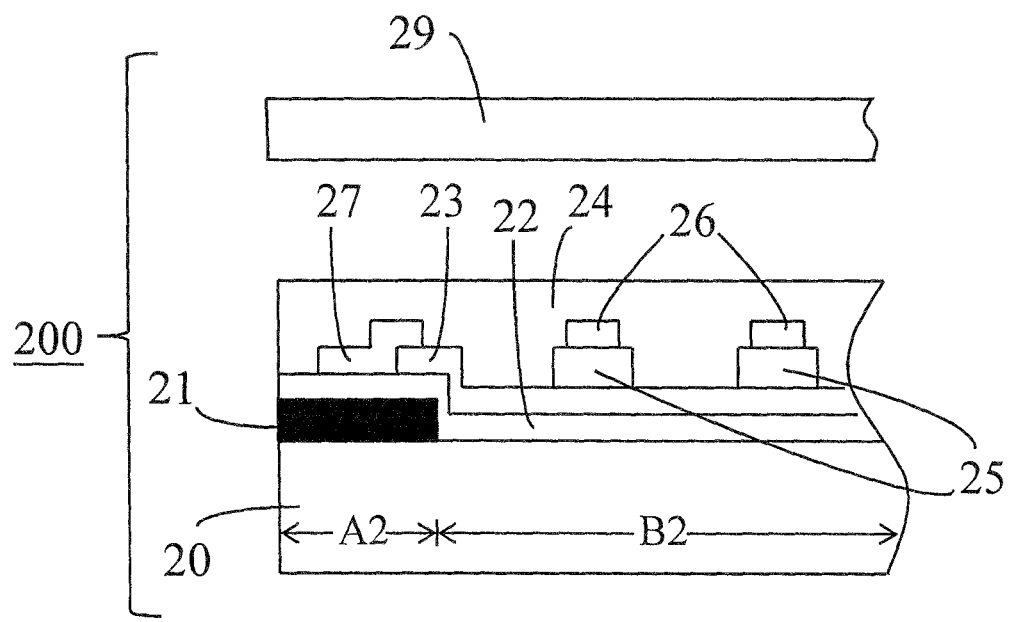
FIG. 2 is the schematic diagram showing a cross-sectional view of a touch display device along the thickness direction, i.e. a direction perpendicular to the display surface, in one embodiment of the present disclosure.

FIG. 2 is a cross-sectional view of a touch display device along the thickness direction, i.e. a direction perpendicular to the display surface, in one embodiment of the present disclosure. As shown in FIG. 2, the touch display device 200 includes a transparent substrate 20, a light-blocking frame layer 21, a color shift adjusting layer 22, a first conductive layer 23, an insulation layer 25, a second conductive layer 26, a metal line 27, a transparent protecting layer 24 and a display module 29. The transparent substrate 20 includes a frame area A2 and a visual area B2, and the light-blocking frame layer 21 is disposed above the frame area A2 of the transparent substrate 20. From the pictures displayed by the display module 29 above the transparent substrate 20, the light beam emitted downwardly onto the frame area A2 of the light-blocking frame layer 21 will be absorbed and blocked, since the light-blocking frame layer 21 has the function of light blocking; while the light beam emitted onto the visual area B2 will pass through the transparent substrate 20 and reach the eyes of the viewer.

The color shift adjusting film 22 is disposed above the visual area B2 and the light-blocking frame layer 21 of the transparent substrate 20 for adjusting and correcting the color shift of the touch display device 200. The color shift adjusting film 22 can include a single layer or plural layers. The thickness of the single layer or each of the plural layers can be in a range of 8 to 200 nanometers, and the material of the single layer or each of the plural layers can be selected from silicon oxide, silicon oxynitride, titanic oxide, tantalum oxide, niobium oxide and the combination thereof. The color shift adjusting film 22 includes different portions directly contacting the transparent substrate 20 and the light-blocking frame layer 21, respectively, as shown in FIG. 2.

In this embodiment, the first conductive layer 23 is disposed above the transparent substrate 20, and the projection of the first conductive layer 23 on the transparent substrate 20 can partially overlaps the light-blocking frame layer 21. As shown in FIG. 2, the insulation layer 25 is disposed above the first conductive layer 23. The second conductive layer 26 is disposed above the insulation layer 25 and the first conductive layer 23. The metal line 27 is electrically connected with the first conductive layer 23. The transparent protecting layer 24 is disposed above the transparent substrate 20 and the light-blocking frame layer 21, and serves as an insulation layer.

In the present embodiment, the material of the light-blocking frame layer 21, which can directly contact the transparent substrate 20 as shown in FIG. 2, can be black opaque material.

In other embodiments, other layers, e.g. a color shift adjusting film, can intervene between the light-blocking frame layer 21 and the transparent substrate 20.

In this embodiment, the transparent protecting layer 24 covers the first conductive layer 23, the insulation layer 25, the second conductive layer 26 and the metal line 27.

The first conductive layer 23 is disposed above and directly contacts the color shift adjusting film 22, and the material of the first conductive layer 23 can be transparent conductive material; while the material of the second conductive layer 26 can be metal, alloy or the transparent conductive material, which can be selected from indium tin oxide, gallium zinc oxide or other transparent conductive oxide.

Similarly, like the top view of the FIG. 1B, the bottom surface and the top surface of the insulation layer 25 can directly contact the first conductive layer 23 and the second conductive layer 26, respectively. Like the top view of FIG. 1B, the insulation layer 25 is patterned to form a matrix structure consisting of aligned plural lumps, and the first conductive layer 23 is patterned to form regularly aligned plural rhombuses (can be other shapes and are not limited to rhombus shape). The second conductive layer 26 is patterned to form a matrix structure consisting of aligned plural lumps, which is located right above the matrix structure of the insulation layer 25. Each of the plural lumps in the second conductive layer 26 is connected with two adjacent rhombuses (can be other shapes and are not limited to rhombus shape) of the first conductive layer 23 in the vertical direction to form an electrically connected tier (or column) from top to bottom like the top view as shown in FIG. 1B. The sensed signal in each tier can be transmitted out from the metal line 27 located above the top of each tier. The other rhombuses, not connected with the second conductive layer 26, of the first conductive layer 23 are originally connected through patterning in the horizontally direction to form plural electrically connected rows of rhombuses. Similarly, the sensed signal in each row can be transmitted out from the metal line 27 located on the right of each row. The whole structure resulting from patterning the above first conductive layer 23, the insulation layer 25 and the second conductive layer 26 can form plural transparent electrode patterns.

In this embodiment, the first conductive layer 23, the insulation layer 25, the second conductive layer 26 and the metal line 27 form a capacitance touch sensing structure. The material of the metal line 27 can be selected from molybdenum, aluminum, copper, silver, other metal or the alloy thereof. The metal line 27 can be disposed above and directly contact the color shift adjusting film 22.

In this embodiment, the display module 29 is disposed above the transparent substrate 20 for displaying pictures. The display module 29 can be selected from a liquid crystal display (LCD) module, a light emitting diode (LED) display module, an organic light emitting diode (OLED) display module and a polymer light emitting diode (PLED) display module. The light beam of the pictures displayed by the display module 29 can pass through the transparent protecting layer 24, the second conductive layer 26, the insulation layer 25, the first conductive layer 23, the color shift adjusting film 22 and the transparent substrate 20, and reach eyes of a viewer. On the other hand, the light beam reaching the light-blocking frame layer 21 will be absorbed and blocked thereby, and will not reach the transparent substrate 20, so can not be seen by the viewer.

Figure 3A:
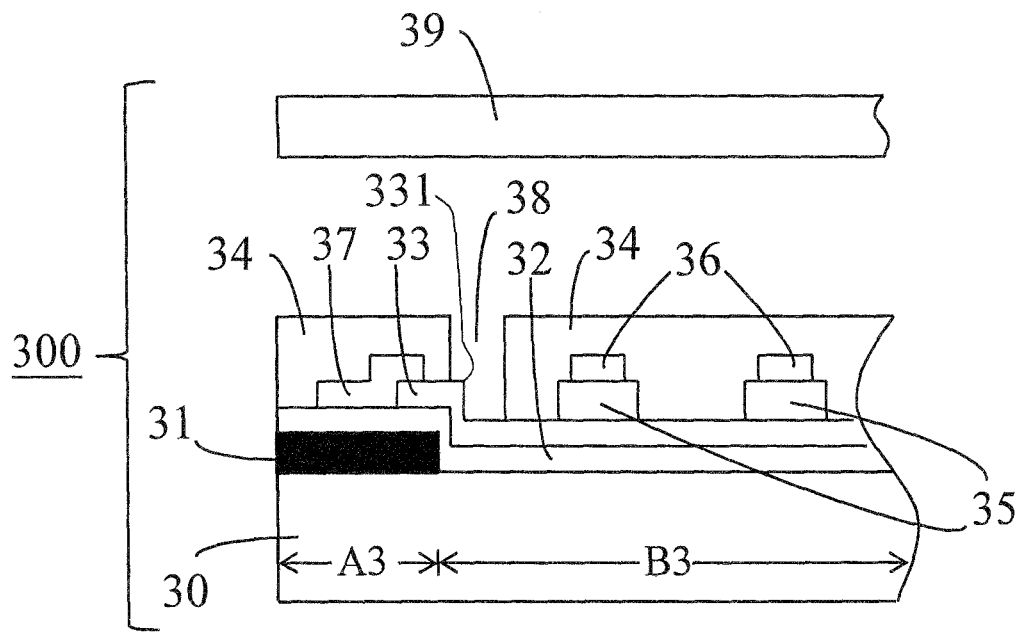
FIG. 3A is the schematic diagram showing a cross-sectional view of a touch display device along the thickness direction, i.e. a direction perpendicular to the display surface, in one embodiment of the present disclosure.

FIG. 3A is a cross-sectional view of a touch display device along the thickness direction, i.e. a direction perpendicular to the display surface, in one embodiment of the present disclosure. As shown in FIG. 3A, the touch display device 300 includes a transparent substrate 30, a light-blocking frame layer 31, a color shift adjusting film 32, a first conductive layer 33, an insulation layer 35, a second conductive layer 36, a metal line 37, a mura-eliminating structure 38, a transparent protecting layer 34 and a display module 39. The transparent substrate 30 includes a frame area A3 and a visual area B3, and the light-blocking frame layer 31 is disposed above the frame area A3 of the transparent substrate 30. From the pictures displayed by the display module 39 above the transparent substrate 30, the light beam emitted downwardly onto the frame area A3 of the light-blocking frame layer 31 will be absorbed and blocked, since the light-blocking frame layer 31 has the function of light blocking; while the light beam emitted onto the visual area B3 will pass through the transparent substrate 30 and reach the eyes of the viewer.

The color shift adjusting film 32 is disposed above the visual area B3 of the transparent substrate 30 for adjusting and correcting the color shift of the touch display device 300. The color shift adjusting film 32 can include a single layer or plural layers. The thickness of the single layer or each of the plural layers can be in a range of 8 to 200 nanometers, and the material of the single layer or each of the plural layers can be selected from silicon oxide, silicon oxynitride, titanic oxide, tantalum oxide, niobium oxide and the combination thereof. The color shift adjusting film 32 includes different portions directly contacting the transparent substrate 30 and the light-blocking frame layer 31, respectively, as shown in FIG. 3A.

In this embodiment, the color shift adjusting film 32 can effectively adjust and correct the color shift of the displayed pictures so that the displayed pictures can have ideal color temperature and significantly promote the visual performance.

In this embodiment, the first conductive layer 33 is disposed above the transparent substrate 30, and the projection of the first conductive layer 33 on the transparent substrate 30 can partially overlaps the light-blocking frame layer 31. As shown in FIG. 3A, the insulation layer 35 is disposed above the first conductive layer 33. The second conductive layer 36 is disposed above the insulation layer 35 and the first conductive layer 33. The metal line 37 is electrically connected with the first conductive layer 33. The transparent protecting layer 34 is disposed above the transparent substrate 30 and the light-blocking frame layer 31, and serves as an insulation layer.

In the present embodiment, the material of the light-blocking frame layer 31, which can directly contact the transparent substrate 30 as shown in FIG. 3A, can be black opaque material. In other embodiments, other layers, e.g. a color shift adjusting film, can intervene between the light-blocking frame layer 31 and the transparent substrate 30.

In this embodiment, the transparent protecting layer 34 covers the first conductive layer 33, the insulation layer 35, the second conductive layer 36 and the metal line 37.

The first conductive layer 33 can be disposed above and directly contact the color shift adjusting film 32, and the material of the first conductive layer 33 can be transparent conductive material; while the material of the second conductive layer 36 can be metal, alloy or the transparent conductive material, which can be selected from indium tin oxide, gallium zinc oxide or other transparent conductive oxide.

Similarly, like the top view of the FIG. 1B, the bottom surface and the top surface of the insulation layer 35 can directly contact the first conductive layer 33 and the second conductive layer 36, respectively. Like the top view of FIG. 1B, the insulation layer 35 is patterned to form a matrix structure consisting of aligned plural lumps. The first conductive layer 33 is patterned to form regularly aligned plural rhombuses (can be other shapes and are not limited to rhombus shape). The second conductive layer 36 is patterned to form a matrix structure consisting of aligned plural lumps, which is located right above the matrix structure of the insulation layer 35. Each of the plural lumps in the second conductive layer 36 is connected with two adjacent rhombuses (can be other shapes and are not limited to rhombus shape) of the first conductive layer 33 in the vertical direction to form an electrically connected tier (or column) from top to bottom like the top view as shown in FIG. 1B. The sensed signal in each tier can be transmitted out from the metal line 37 located above the top of each tier. The other rhombuses, not connected with the second conductive layer 36, of the first conductive layer 33 are originally connected through patterning in the horizontally direction to form plural electrically connected rows of rhombuses. Similarly, the sensed signal in each row can be transmitted out from the metal line 37 located on the right of each row. The whole structure resulting from patterning the above first conductive layer 33, the insulation layer 35 and the second conductive layer 36 can form plural transparent electrode patterns.

In this embodiment, the first conductive layer 33, the insulation layer 35, the second conductive layer 36 and the metal line 37 form a capacitance touch sensing structure. The material of the metal line 37 can be selected from molybdenum, aluminum, copper, silver, other metal or the alloy thereof. The metal line 37 can be disposed above the color shift adjusting film 32, and can directly contact the color shift adjusting film 32 and the first conductive layer 33.

In this embodiment, the display module 39 is disposed above the transparent substrate 30 for displaying pictures. The display module 39 can be selected from a liquid crystal display (LCD) module, a light emitting diode (LED) display module, an organic light emitting diode (OLED) display module and a polymer light emitting diode (PLED) display module. The light beam of the pictures displayed by the display module 39 can pass through the transparent protecting layer 34, the mura-eliminating structure 38, the second conductive layer 36, the insulation layer 35, the first conductive layer 33, the color shift adjusting film 32 and the transparent substrate 30, and reach eyes of a viewer. On the other hand, the light beam reaching the light-blocking frame layer 31 will be absorbed and blocked thereby, and will not reach the transparent substrate 30, so can not be seen by the viewer.

Similarly, in this embodiment, the touch display device 300 includes the mura-eliminating structure 38, e.g. a gap, which can be disposed according to a boundary between the visual area B3 and frame area A3 for eliminating interference mura appearing in the visual area B3. The projection of the mura-eliminating structure 38, e.g. the gap, on the transparent substrate 30 can partially overlap the light-blocking frame layer 31, be adjacent to the light-blocking frame layer 31 without overlapping, or be located at a distance within 2 millimeters from the light-blocking frame layer 31, so as to effectively eliminate the interference mura. Although, the mura-eliminating structure 38 in this embodiment is a gap, but the mura-eliminating structure 38 can be a structure stuffed by the material with the refractive index lower than that of the transparent protecting layer 34 and located at the same location based on the concept of the present disclosure.

In one embodiment, the touch display device 300 further includes a material having a refractive index lower than a refractive index of the transparent protecting layer 34, wherein the mura-eliminating structure 18 is filled with the material. For instance, the material includes an optical adhesive, which has a refractive index ranged from 1.3 to 1.6 (typically ranged from 1.45 to 1.55). For instance, the material includes a magnesium fluoride ($MgF_2$), which has a refractive index ranged from 1.3 to 1.48 (typically ranged from 1.35 to 1.39). In one embodiment, the first conductive layer 33 has a corner 331 coupled to the gap. The corner 331 is exposed to the gap; that is, the corner 331 has a top surface and a side surface adjacent to the top surface, wherein each of the top and the side surfaces is exposed to the gap.

In this embodiment, the other portion of the transparent protecting layer 34 except the mura-eliminating structure 38, e.g. the gap, can cover the first conductive layer 33, the insulation layer 35, the second conductive layer 36, the metal line 37 and the color shift adjusting film 32. The width of the gap can be in a range from 20 microns to 2 millimeters. In one embodiment, the light-blocking frame layer 31 has an inner edge, the gap has an outer edge disposed inwards from the inner edge, and the inner edge and the outer edge have the distance therebetween. For instance, the distance is ranged from 0 to 2000 microns. It is preferred that the distance is ranged from 10 microns to 100 microns. The gap can form a surrounding groove, like a city moat surrounding the city (i.e. the surrounding groove surrounding the visual area B3 in this embodiment), along the boundary between the frame area A3 and the visual area B3. This surrounding groove is usually rectangular from a top view, since the touch panel is usually rectangular. In one embodiment, this surrounding groove is one of a closed surrounding groove and an open surrounding groove. In one embodiment, the gap includes a plurality of gap portions, and each of the plurality of gap portions forms an open surrounding groove.

In this embodiment, the mura-eliminating structure 38 can effectively eliminate interference mura appearing around the outline area of the visual area B3 and greatly promote the visual performance of the touch display device 300. Simultaneously, the color shift adjusting film 32 can effectively adjust and correct the color shift of the displayed pictures so that the displayed pictures can have ideal color temperature, and the visual performance can be significantly promoted.

Figure 3B:
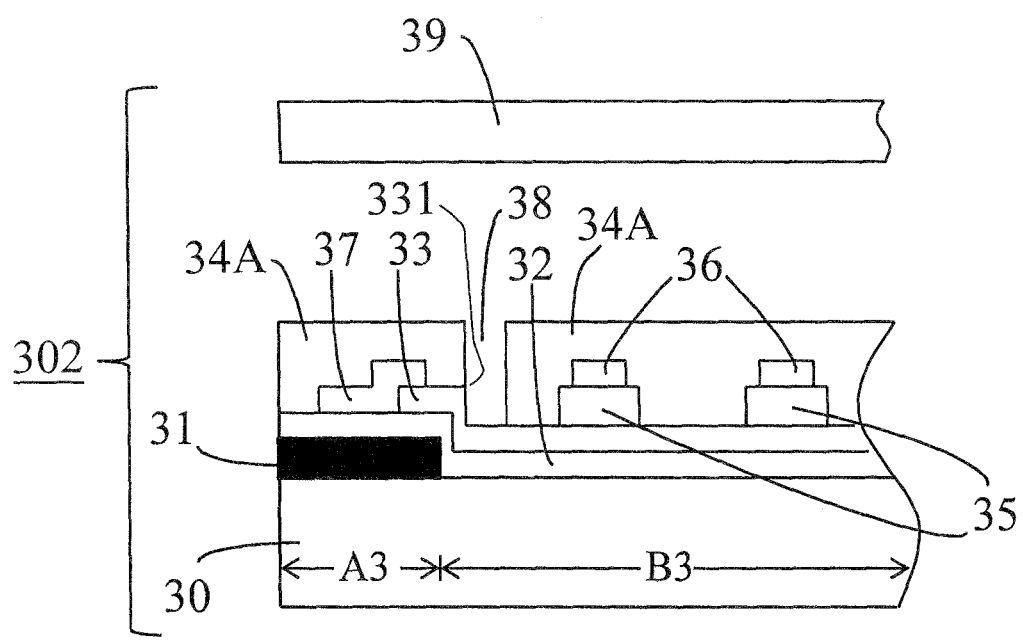
FIG. 3B is the schematic diagram showing a cross-sectional view of a touch display device along the thickness direction, i.e. a direction perpendicular to the display surface, in one embodiment of the present disclosure.

FIG. 3B is the schematic diagram showing a cross-sectional view of a touch display device along the thickness direction, i.e. a direction perpendicular to the display surface, in one embodiment of the present disclosure. As shown in FIG. 3B, the touch display device 302 includes a transparent substrate 30, a light-blocking frame layer 31, a color shift adjusting film 32, a first conductive layer 33, an insulation layer 35, a second conductive layer 36, a metal line 37, a mura-eliminating structure 38, a transparent protecting layer 34A and a display module 39. The structure of the touch display device 302 in FIG. 3B is similar to the structure of the touch display device 300 in FIG. 3A. The characteristic features of the touch display device 302 are described as follows. The transparent protecting layer 34A is disposed above the transparent substrate 30 and the light-blocking frame layer 31, and also includes a frame area A1 and a visual area B1 vertically corresponding to the frame area A1 and the visual area B1 of the transparent substrate 30, respectively.

The mura-eliminating structure 38, e.g. the gap, is disposed between the frame area A1 of the transparent protecting layer 34A and the visual area B1 of the transparent protecting layer 34A. The first conductive layer 33 has a corner 331 coupled to the gap. The corner 331 is partially exposed to the gap; that is, the corner 331 has a top surface and a side surface adjacent to the top surface, wherein the top surface is covered with the transparent protecting layer 34A (or the frame area A1 of the transparent protecting layer 34A), and the side surface is exposed to the gap. In one embodiment, the transparent protecting layer 34A has a side surface, which is exposed to the gap and is aligned with the side surface of the corner 331.

Figure 4:
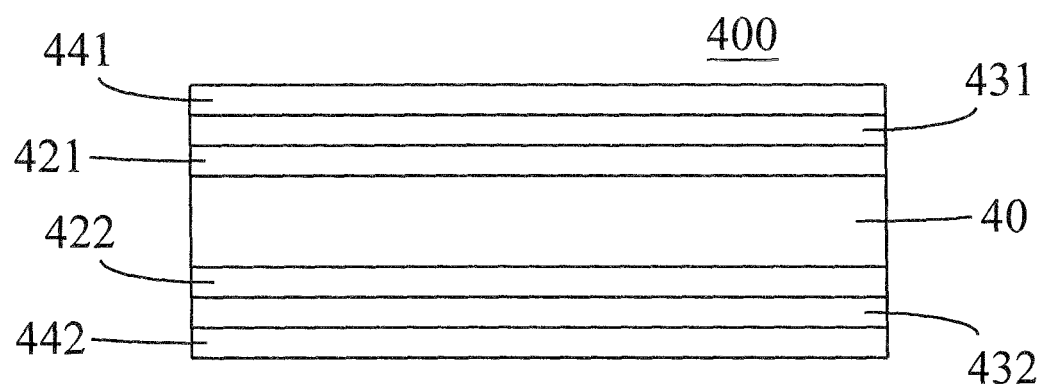
FIG. 4 is the schematic diagram showing a cross-sectional view of a touch display device along the thickness direction, i.e. a direction perpendicular to the display surface, in one embodiment of the present disclosure.

FIG. 4 is a cross-sectional view of a touch display device along the thickness direction, i.e. a direction perpendicular to the display surface, in one embodiment of the present disclosure. As shown in FIG. 4, the touch display device 400 includes a first transparent protecting layer 441, a touch sensing structure 431, a first color shift adjusting film 421, a transparent substrate 40, a second color shift adjusting film 422, an anti-noise transparent conductive layer 432 and a second transparent protecting layer 442.

In this embodiment, the touch sensing structure 431 can provide the same touch sensing function as those of the above other embodiments. That is to say, the touch sensing structure 431 can include a touch sensing structure consisting of the first transparent conductive layer 13, the insulation layer 15, the second transparent conductive layer 16 and the metal line 17 as shown in FIG. 1B, or other touch sensing structures. In this embodiment, since the anti-noise transparent conductive layer 432 is located close to the display module (not shown) beneath, e.g. a liquid crystal display module, and is electrically conductive itself, the anti-noise transparent conductive layer 432 is able to shield the electrical interference from the display module. In addition, in this embodiment, the color shift adjusting film is divided into tow parts, i.e. the first color shift adjusting film 421 and the second color shift adjusting film 422. The combination of the optical effects of these two films can provide the function of adjusting and correcting the color shift of the displayed pictures so that the displayed pictures can have ideal color temperature. In addition, the outermost surfaces of both sides (i.e. top and bottom sides) of the transparent substrate 40 are coated with transparent protecting layers, i.e. the first transparent protecting layer 441 and the second transparent protecting layer 442 for protecting the internal layers thereinside.

In the present embodiment, the first color shift adjusting film 421 and the second color shift adjusting film 422 can effectively adjust and correct the color shift of the displayed pictures so that the displayed pictures can have ideal color temperature, and the visual performance can be significantly promoted. On the other hand, the mura-eliminating structure, e.g. the gap, in the above other embodiments can be introduced into the first transparent protecting layer 441 and the second transparent protecting layer 442 in this embodiment so as to eliminate any interference mura appearing around the outline area of the visual area for greatly promoting the visual performance.

Figure 5:
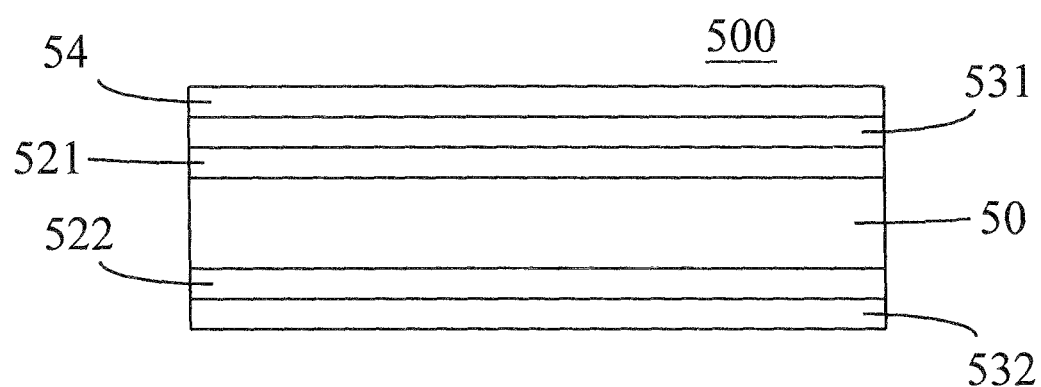
FIG. 5 is the schematic diagram showing a cross-sectional view of a touch display device along the thickness direction, i.e. a direction perpendicular to the display surface, in one embodiment of the present disclosure.

FIG. 5 is a cross-sectional view of a touch display device along the thickness direction, i.e. a direction perpendicular to the display surface, in one embodiment of the present disclosure. As shown in FIG. 5, the touch display device 500 includes a transparent protecting layer 54, a touch sensing structure 531, a first color shift adjusting film 521, a transparent substrate 50, a second color shift adjusting film 522 and an anti-noise transparent conductive layer 532.

In this embodiment, the touch sensing structure 531 can be the same as or different from the touch sensing structure 431 shown in FIG. 4. Similarly, the anti-noise transparent conductive layer 532 can shield the electrical interference from the display module beneath, and accordingly have the anti-noise function. Besides, in this embodiment, the color shift adjusting film is also divided into two parts, i.e. the first color shift adjusting film 521 and the second color shift adjusting film 522. The combination of the optical effects of these two films can provide the function of adjusting and correcting the color shift of the displayed pictures so that the displayed pictures can have ideal color temperature. In this embodiment, only the top surface of the transparent substrate 50 is configured with the transparent protecting 54 for protecting the internal layers thereinside. The bottom surface of the transparent substrate 50 is not coated with any transparent protecting layer. Since an LCD module can be configured below the transparent substrate 50, if the top surface of the LCD module is coated with a protecting layer, or no undesired short circuit between the anti-noise transparent conductive layer 532 and the LCD module can possibly happen, the protecting layer at the bottom surface of the transparent substrate 50 is unnecessary to save cost and to reduce the thickness and the manufacturing process therefor.

In the present embodiment, the first color shift adjusting film 521 and the second color shift adjusting film 522 can effectively adjust and correct the color shift of the displayed pictures so that the displayed pictures can have ideal color temperature, and the visual performance can be significantly promoted. On the other hand, the mura-eliminating structure, e.g. the gap, in the above embodiments shown in FIGS. 1A, 1B and 3 can be introduced into the transparent protecting layer 54 in this embodiment so as to eliminate any interference mura appearing around the outline area of the visual area for greatly promoting the visual performance.

Figure 6:
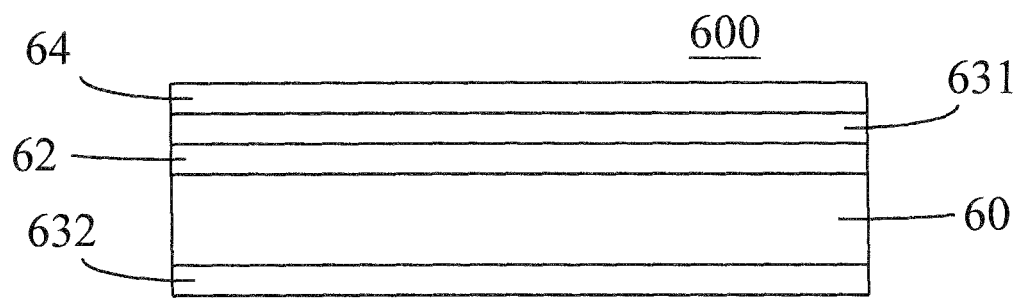
FIG. 6 is the schematic diagram showing a cross-sectional view of a touch display device along the thickness direction, i.e. a direction perpendicular to the display surface, in one embodiment of the present disclosure.

FIG. 6 is a cross-sectional view of a touch display device along the thickness direction, i.e. a direction perpendicular to the display surface, in one embodiment of the present disclosure. As shown in FIG. 6, the touch display device 600 includes a transparent protecting layer 64, a touch sensing structure 631, a color shift adjusting film 62, a transparent substrate 60 and an anti-noise transparent conductive layer 632.

In this embodiment, the touch sensing structure 631 can be the same as or different from the touch sensing structures 431 and 531 shown in FIGS. 4 and 5, respectively. Similarly, the anti-noise transparent conductive layer 632 can shield the electrical interference from the display module beneath, and accordingly have the anti-noise function. Besides, in this embodiment, only the top of the transparent substrate 60 is configured with the color shift adjusting film 62 adjusting and correcting the color shift of the displayed pictures so that the displayed pictures can have ideal color temperature. In this embodiment, there is no color shift adjusting film at the bottom of the transparent substrate 60. In this embodiment, like the embodiment shown in FIG. 5, only the top of the transparent substrate 60 is configured with the transparent protecting layer 64 for protecting the internal layers thereinside, and there is no transparent protecting layer at the bottom of the transparent substrate 60.

Similarly, in the present embodiment, the color shift adjusting film 62 can effectively adjust and correct the color shift of the displayed pictures so that the displayed pictures can have ideal color temperature, and the visual performance can be significantly promoted. On the other hand, the mura-eliminating structure, e.g. the gap, in the above embodiments shown in FIGS. 1A, 1B and 3 can be introduced into the transparent protecting layer 64 in this embodiment so as to eliminate any interference mura appearing around the outline area of the visual area for greatly promoting the visual performance.

Figure 7:
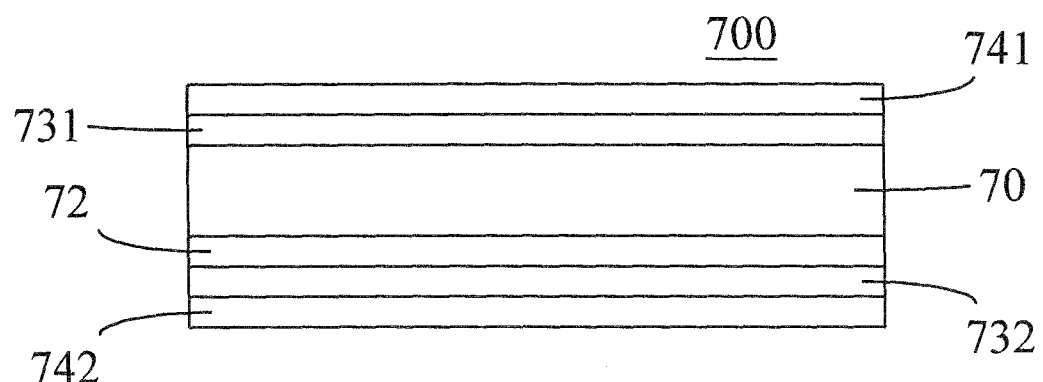
FIG. 7 is the schematic diagram showing a cross-sectional view of a touch display device along the thickness direction, i.e. a direction perpendicular to the display surface, in one embodiment of the present disclosure.

FIG. 7 is a cross-sectional view of a touch display device along the thickness direction, i.e. a direction perpendicular to the display surface, in one embodiment of the present disclosure. As shown in FIG. 7, the touch display device 700 includes a first transparent protecting layer 741, a touch sensing structure 731, a transparent substrate 70, a color shift adjusting film 72, an anti-noise transparent conductive layer 732 and a second transparent protecting layer 742.

In this embodiment, the touch sensing structure 731 can be the same as or different from the touch sensing structures 431,

531 and 631 shown in FIGS. 4, 5 and 6, respectively. Similarly, the anti-noise transparent conductive layer 732 can shield the electrical interference from the display module beneath, and accordingly have the anti-noise function. Besides, in this embodiment, only the bottom of the transparent substrate 70 is configured with the color shift adjusting film 72 for adjusting and correcting the color shift of the displayed pictures so that the displayed pictures can have ideal color temperature. In this embodiment, there is no color shift adjusting film on the top of the transparent substrate 70 as a reverse design in contrast to that shown in FIG. 6. In this embodiment, like the embodiment shown in FIG. 4, the outmost surfaces of both sides (i.e. top and bottom sides) of the transparent substrate 70 are coated with transparent protecting layers, i.e. the first transparent protecting layer 741 and the second transparent protecting layer 742 for protecting the internal layers thereinside.

Similarly, in the present embodiment, the color shift adjusting film 72 can effectively adjust and correct the color shift of the displayed pictures so that the displayed pictures can have ideal color temperature, and the visual performance can be significantly promoted. On the other hand, the mura-eliminating structure, e.g. the gap, in the above embodiments shown in FIGS. 1A, 1B, 1C and 3A, 3B can be introduced into the first transparent protecting layer 741 and the second transparent protecting layer 742 in this embodiment so as to eliminate any interference mura appearing around the outline area of the visual area for greatly promoting the visual performance.

Figure 8:
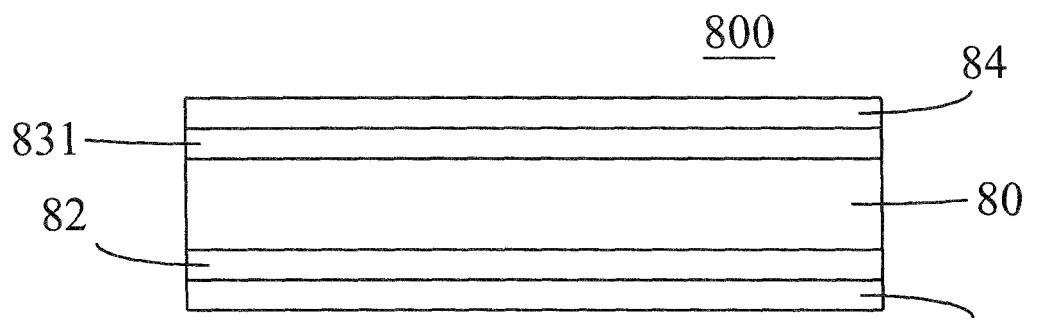
FIG. 8 is the schematic diagram showing a cross-sectional view of a touch display device along the thickness direction, i.e. a direction perpendicular to the display surface, in one embodiment of the present disclosure.

FIG. 8 is a cross-sectional view of a touch display device along the thickness direction, i.e. a direction perpendicular to the display surface, in one embodiment of the present disclosure. As shown in FIG. 8, the touch display device 800 includes a transparent protecting layer 84, a touch sensing structure 831, a transparent substrate 80, a color shift adjusting film 82 and an anti-noise transparent conductive layer 832.

In this embodiment, the touch sensing structure 831 can be the same as or different from the touch sensing structures 431, 531, 631 and 731 shown in FIGS. 4, 5, 6 and 7, respectively. Similarly, the anti-noise transparent conductive layer 832 can shield the electrical interference from the display module beneath, and accordingly have the anti-noise function. Besides, in this embodiment, only the bottom of the transparent substrate 80 is configured with the color shift adjusting film 82 for adjusting and correcting the color shift of the displayed pictures so that the displayed pictures can have the ideal color temperature. In this embodiment, there is no color shift adjusting film on the top the transparent substrate 80 as the same design as that shown in FIG. 7. In this embodiment, like the embodiments shown in FIGS. 5 and 6, only the top of the transparent substrate 80 is configured with the transparent protecting layer 84 for protecting the internal layers thereinside, and there is no transparent protecting layer at the bottom of the transparent substrate 80.

Similarly, in the present embodiment, the color shift adjusting film 82 can effectively adjust and correct the color shift of the displayed pictures so that the displayed pictures can have ideal color temperature, and the visual performance can be significantly promoted. On the other hand, the mura-eliminating structure, e.g. the gap, in the above embodiments shown in FIGS. 1A, 1B and 3 can be introduced into the transparent protecting layer 84 in this embodiment so as to eliminate any interference mura appearing around the outline area of the visual area for greatly promoting the visual performance.

It is noted that the light beams of the pictures displayed by the display modules (not shown) in the touch display devices shown in FIGS. 4-8 are emitted upwardly to reach eyes of a viewer; while the light beam of the pictures displayed by the display modules in the touch display devices shown in FIGS. 1A-3B are emitted downwardly to reach eyes of a viewer.

Some embodiments of the present disclosure are described in the followings.

1. A touch display device comprising: a transparent substrate including a frame area and a visual area; a light-blocking frame layer disposed above the frame area of the transparent substrate; and a transparent protecting layer disposed above the transparent substrate and the light-blocking frame layer, and including a gap having a projection on the transparent substrate, wherein the projection of the gap has one of conditions of at least partially overlapping the light-blocking frame layer and being located at a distance less than 2 millimeters from the light-blocking frame layer.

2. A touch display device comprising: a light-blocking frame layer; a transparent protecting layer including a frame area and a visual area; and a mura-eliminating structure disposed between the visual area and the light-blocking frame for eliminating any mura in the visual area.

3. A touch display device of any one of embodiments 1-2 further including plural transparent electrode patterns and a color shift adjusting film, wherein the color shift adjusting film is disposed above the visual area of the transparent substrate for performing one of functions of correcting the color shift of the picture and improving a visual performance of the plural transparent electrode patterns.

4. A touch display device displaying a picture having a color shift, and comprising: a transparent substrate including a frame area and a visual area; plural transparent electrode patterns; a light-blocking frame layer disposed above the frame area of the transparent substrate; and a color shift adjusting film disposed above the visual area of the transparent substrate for performing one of functions of correcting the color shift of the picture and causing the plural transparent electrode patterns to be invisible.

5. A touch display device of any one of the above embodiments, further comprising a first conductive layer disposed above the transparent substrate, and having a projection on the transparent substrate, wherein the projection of the first conductive layer at least partially overlaps the light-blocking frame layer.

6. A touch display device of any one of the above embodiments further comprising an insulation layer disposed above the first conductive layer.

7. A touch display device of any one of the above embodiments further comprising a second conductive layer disposed above the insulation layer and the first conductive layer.

8. A touch display device of any one of the above embodiments further comprising a metal line electrically connected with the first conductive layer.

9. A touch display device displaying a picture having a color shift, and comprising: a transparent substrate; a touch sensing structure disposed above the transparent substrate for enabling a touch-sensing function for the touch control display, wherein the touch sensing structure is patterned to form plural transparent electrode patterns; an anti-noise transparent conductive layer disposed below the transparent substrate for shielding a noise; a color shift adjusting film disposed at one of places above and below the transparent substrate for performing one of functions of correcting the color shift of the picture and causing the plural transparent electrode patterns to be invisible; and a transparent protecting layer disposed above the transparent substrate.

10. A touch display device of any one of the above embodiments, wherein the touch sensing structure includes: a first conductive layer disposed above the transparent substrate; an insulation layer disposed above the first conductive layer; and a second conductive disposed above the insulation layer ad the first conductive layer, wherein the first conductive layer, the insulation layer and second conductive layer are patterned to form plural transparent electrode patterns.

11. A touch display device of any one of the above embodiments, wherein the light-blocking frame layer directly contacts the transparent substrate, and includes an opaque material.

12. A touch display device of any one of the above embodiments, wherein the transparent protecting layer includes a non-gap area excluding the gap, the non-gap area covers the first conductive layer, the insulation layer, the second conductive layer and the metal line, the frame area and the visual area have a boundary therebetween, and the gap has a width in a range of 20 microns to 2 millimeters and forms a surrounding groove along the boundary, wherein the surrounding groove is one of a closed surrounding groove and an open surrounding groove.

13. A touch display device of any one of the above embodiments, wherein the color shift adjusting film includes at least a correcting layer, each the correcting layer has a thickness in a range of 8 to 200 nanometers, and includes a material being one selected from a group consisting of a silicon oxide, a silicon oxynitride, a titanium oxide, a tantalum oxide, a niobium oxide and a combination thereof, and the color shift adjusting film directly contacts the transparent substrate and the light-blocking frame layer.

14. A touch display device of any one of the above embodiments, wherein the first conductive layer includes a transparent conductive material, and is disposed above and directly contacts the color shift adjusting film.

15. A touch display device of any one of the above embodiments, wherein the insulation layer has a bottom surface and a top surface, which directly contact the first conductive layer and the second conductive layer, respectively, and the insulation layer forms a matrix structure consisting of aligned plural lumps.

16. A touch display device of any one of the above embodiments, wherein the second conductive layer includes a material being one selected from a group consisting of a metal, an alloy and the transparent conductive material, and the transparent conductive material includes one of an indium tin oxide and a gallium zinc oxide.

17. A touch display device of any one of the above embodiments, wherein the first conductive layer, the insulation layer, the second conductive layer and the metal line form a capacitance touch sensing structure.

18. A touch display device of any one of the above embodiments, wherein the metal line includes a material being one selected from a group consisting of a molybdenum, an aluminum, a copper, a silver and an alloy thereof, and the metal line is disposed above and directly contacts the color shift adjusting film.

19. A touch display device of any one of the above embodiments, further comprising a display module disposed above the transparent substrate for displaying a picture having a color shift.

20. A touch display device of any one of the above embodiments, wherein the display module includes one selected from a group consisting of a liquid crystal display module, a light emitting diode display module, an organic light emitting diode display module and a polymer light emitting diode display module.

To sum up, the present disclosure provides various touch display devices able to effectively eliminate interference mura appearing around outline areas of visual areas of the touch display devices for greatly promoting visual performance, and simultaneously and effectively to adjust color shift of displayed pictures for reaching ideal color temperature for displayed pictures and significantly promoting visual performance.

While the disclosure has been described in terms of what is presently considered to be the most practical and preferred embodiments, it is to be understood that the disclosure needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch display device, comprising:
   a transparent substrate including a frame area and a visual area;
   a light-blocking frame layer disposed above the frame area of the transparent substrate;
   a transparent protecting layer disposed above the transparent substrate and the light-blocking frame layer, and including a gap having a projection on the transparent substrate, wherein the transparent protecting layer has a first refractive index, and the projection of the gap has one of conditions of at least partially overlapping the light-blocking frame layer and being located at a distance less than 2 millimeters from the light-blocking frame layer;
   a first conductive layer disposed above the transparent substrate, and having a projection on the transparent substrate, wherein the projection of the first conductive layer at least partially overlaps the light-blocking frame layer;
   an insulation layer disposed above the first conductive layer;
   a second conductive layer disposed above the insulation layer and the first conductive layer, wherein the first conductive layer, the insulation layer and the second conductive layer are patterned to form plural transparent electrode patterns;
   a first material having a second refractive index lower than the first refractive index, wherein the gap is filled with the first material;
   a display module disposed above the transparent substrate for displaying a picture having a color shift;
   a color shift adjusting film disposed above the visual area of the transparent substrate for performing one of functions of correcting the color shift of the picture and improving a visual performance of the plural transparent electrode patterns; and
   a metal line electrically connected with the first conductive layer.

2. The touch display device of claim 1, wherein:
   the first conductive layer further has a corner coupled to the gap, wherein the corner has a top surface and a side surface adjacent to the top surface.

3. The touch display device of claim 2, wherein:
   the distance is ranged from 10 microns to 100 microns;
   the side surface is exposed to the gap;
   the top surface is in one of:
      a first state that the top surface is exposed to the gap; and
      a second state that the top surface is covered with the transparent protecting layer;

the light-blocking frame layer directly contacts the transparent substrate, and includes an opaque material;

the frame area and the visual area have a boundary therebetween;

the gap has a width in a range of 20 microns to 2 millimeters and forms a surrounding groove along the boundary, wherein the surrounding groove is one of a closed surrounding groove and an open surrounding groove;

the insulation layer has a bottom surface and a top surface, which directly contact the first conductive layer and the second conductive layer, respectively; and the insulation layer forms a matrix structure consisting of aligned plural lumps.

4. The touch display device of claim 1, wherein:

the transparent protecting layer includes a non-gap area excluding the gap, wherein the non-gap area covers the first conductive layer, the insulation layer, the second conductive layer and the metal line;

the color shift adjusting film includes at least a correcting layer;

each the correcting layer has a thickness in a range of 8 to 200 nanometers, and includes a second material being one selected from a group consisting of a silicon oxide, a silicon oxynitride, a titanium oxide, a tantalum oxide, a niobium oxide and a combination thereof; and the color shift adjusting film directly contacts the transparent substrate and the light-blocking frame layer.

5. The touch display device of claim 1, wherein:

the first conductive layer includes a transparent conductive material, and is disposed above and directly contacts the color shift adjusting film;

the second conductive layer includes a second material being one selected from a group consisting of a metal, an alloy and the transparent conductive material; and the transparent conductive material includes one of an indium tin oxide and a gallium zinc oxide.

6. The touch display device of claim 1, wherein:

the metal line includes a second material being one selected from a group consisting of a molybdenum, an aluminum, a copper, a silver and an alloy thereof;

the metal line is disposed above and directly contacts the color shift adjusting film;

the first conductive layer, the insulation layer, the second conductive layer and the metal line form a capacitance touch sensing structure; and the display module includes one selected from a group consisting of a liquid crystal display module, a light emitting diode display module, an organic light emitting diode display module and a polymer light emitting diode display module.

\* \* \* \* \*